US007862216B2

(12) United States Patent
Friedrichs et al.

(10) Patent No.: US 7,862,216 B2
(45) Date of Patent: Jan. 4, 2011

(54) LIGHTING DEVICE

(75) Inventors: Rainer Friedrichs, Regensburg (DE); Martin Haushalter, Regensburg (DE); Joachim Reill, Zeitlarn (DE); Thomas Reiners, Bachhagel (DE)

(73) Assignees: Osram Opto Semiconductors GmbH, Regensberg (DE); Osram Gesellschaft mit bechrankter Haftung, Munich (DE)

( * ) Notice: Subject to any disclaimer, the term of this patent is extended or adjusted under 35 U.S.C. 154(b) by 478 days.

(21) Appl. No.: 11/815,036

(22) PCT Filed: Feb. 13, 2006

(86) PCT No.: PCT/DE2006/000250

§ 371 (c)(1),
(2), (4) Date: Jan. 7, 2008

(87) PCT Pub. No.: WO2006/086953

PCT Pub. Date: Aug. 24, 2006

(65) Prior Publication Data

US 2008/0137357 A1 Jun. 12, 2008

(30) Foreign Application Priority Data

Feb. 16, 2005 (DE) ....................... 10 2005 007 218
Aug. 30, 2005 (DE) ....................... 10 2005 041 065

(51) Int. Cl.
*B60Q 3/00* (2006.01)
*B60Q 1/00* (2006.01)

(52) U.S. Cl. ........................ 362/507; 362/294; 362/547

(58) Field of Classification Search ................. 362/507, 362/509, 543, 544, 545, 294, 373, 547
See application file for complete search history.

(56) References Cited

U.S. PATENT DOCUMENTS 6,527,411 B1 3/2003 Sayers
6,601,980 B2 8/2003 Kobayashi et al.
7,150,552 B2 12/2006 Weidel (Continued)

FOREIGN PATENT DOCUMENTS

CN 1526587 9/2004

(Continued)

OTHER PUBLICATIONS

International Search Report from the European Patent Office dated May 15, 2006. Search performed by Prévot, E.

(Continued)

*Primary Examiner*—John A Ward
(74) *Attorney, Agent, or Firm*—Fish & Richardson P.C.

(57) ABSTRACT

A lighting device is disclosed, which is provided for the front region of a motor vehicle, for example in a motor vehicle headlight, and which emits electromagnetic radiation during operation. The lighting device comprises at least one first primary radiation source which emits infrared radiation, and at least one second primary radiation source which emits visible light, wherein the first primary radiation source and the second primary radiation source are arranged in such a way that the second primary radiation source outshines the first primary radiation source and thus generates a color impression of the lighting device which deviates from the color impression stemming from the infrared radiation source alone.

19 Claims, 13 Drawing Sheets

U.S. PATENT DOCUMENTS

| | | | | |
|---|---|---|---|---|
| 7,370,998 | B2 * | 5/2008 | Sasaki et al. ................ | 362/545 |
| 2004/0174712 | A1 | 9/2004 | Yagi | |
| 2004/0240219 | A1 | 12/2004 | Oishi et al. | |
| 2006/0076572 | A1 | 4/2006 | Huber et al. | |
| 2007/0008734 | A1 * | 1/2007 | Bogner et al. ............... | 362/509 |

FOREIGN PATENT DOCUMENTS

| | | |
|---|---|---|
| DE | 10230639 | 1/2004 |
| EP | 1270324 | 6/2002 |
| EP | 1643188 | 4/2006 |
| JP | 2000-36885 | 2/2000 |
| JP | 2001-229717 | 8/2001 |
| WO | WO 97/50132 | 12/1997 |
| WO | WO 98/12457 | 3/1998 |
| WO | WO 98/12757 | 3/1998 |
| WO | WO 02/084749 | 10/2002 |
| WO | WO 2004/059207 | 7/2004 |
| WO | WO 2004/088200 | 10/2004 |

OTHER PUBLICATIONS

Schnitzer et al., "30% external quantum efficiency from surface textured, thin-film light-emitting diodes" *Appl. Phys. Lett.* 63(16):2174-2176 (1993).

Japan Patent Office, "Translation of the Reasons for Rejections", mailed on Apr. 6, 2010 (3 pages).

* cited by examiner

LIGHTING DEVICE

CROSS-REFERENCE TO RELATED APPLICATIONS

This application is the National Stage of International Application No. PCT/DE2006/000250, filed on Feb. 13, 2006, which claims the priority to German Patent Applications Serial No. 102005007218.6, filed on Feb. 16, 2005 and Serial No. 102005041065.0, filed on Aug. 30, 2005. The contents of all applications are hereby incorporated by reference in their entireties.

FIELD OF THE INVENTION

The invention relates to a lighting device, in particular for the front region of a motor vehicle, and to a motor vehicle headlight.

BACKGROUND

Infrared radiation sources are intended to be applied in motor vehicles as lighting sources, for example in night vision systems, sensor technology systems for pedestrian protection or distance sensor technology. The emission spectrum of infrared radiation sources often also encompasses red components of the visible light spectrum (in this respect, cf. FIG. 1), which leads to an in many cases undesirable red color impression for the observer. Furthermore, it is also conceivable that the human eye is also at least partly sensitive to infrared radiation, in particular near the red end of the visible spectrum, and, therefore, such radiation also leaves the observer with an undesirable red color impression. In the front region of vehicles, red light even contravenes regulations currently in force.

SUMMARY

One object of the present invention is to specify a lighting device, for example for use in the front region of motor vehicles, which comprises at least one infrared radiation source and does not leave the observer with a red color impression. A further object of the present invention is to specify a motor vehicle headlight comprising an infrared radiation source, which headlight likewise does not leave the observer with a red color impression.

The disclosure content of the patent claims is hereby explicitly incorporated in the description.

A lighting device according to the invention comprises, in addition to at least one first infrared radiation source (referred to generally as "infrared radiation source" hereinafter), furthermore at least one second radiation source which emits visible light having a color locus in the visible region of the CIE standard chromaticity diagram (referred to generally as "visible radiation source" hereinafter), wherein the visible radiation source outshines the infrared radiation source. In the present context the term "outshine" is understood to mean that the radiation from the visible radiation source mixes with the radiation from the infrared radiation source, such that the red color impression of the infrared radiation source for the observer is significantly reduced, or generates for the observer a color impression which deviates from the color impression stemming from the infrared radiation source alone.

In order that the radiation from the infrared radiation source can mix with the radiation from the visible radiation source in such a way that the red color impression of the infrared radiation source is significantly reduced for an observer at a desired distance from the lighting device, or a color impression is generated which deviates from the color impression stemming from the infrared radiation source alone, the radiation sources have to be arranged suitably, in particular, for example in an array or a matrix, wherein the distances between the radiation sources are significantly less than the distance between the observer and the lighting device. It is also possible, furthermore, for the radiation from the radiation sources to be mixed with the aid of an optical unit.

A lighting device according to the invention affords the advantage that it is not necessary to use any filters for blocking the visible red components of the electromagnetic radiation emitted by the infrared radiation source. In contrast to a red color impression of the lighting device on account of red spectral components of the infrared radiation source, a red color impression of the lighting device caused by the infrared radiation itself cannot be prevented by the use of filters since the latter would then have to block the desired infrared radiation.

In a preferred embodiment, the second radiation source emits visible light having a color locus in the white region of the CIE standard chromaticity diagram.

Furthermore, a white color impression of the lighting device is preferably generated. A white color impression of the lighting device can be generated, for example, as already mentioned above, by the infrared radiation source being outshone by means of a white visible radiation source. However, it is also conceivable for the visible red light emitted by the infrared radiation source to be mixed with green visible light, for example, and thus likewise for a white color impression of the lighting device to be generated.

A lighting device which generates a white color impression for the observer affords the advantage that the visible light emitted by the lighting device can be integrated into the light of a headlight in a simple manner. Furthermore, a lighting device with a white color impression can advantageously be used in addition as position light.

Preferably, a semiconductor-based light-emitting diode chip is used as infrared radiation source. Said chip comprises an active epitaxial layer sequence suitable for generating electromagnetic radiation during operation.

For generating radiation, the epitaxial layer sequence may have for example a pn junction, a double heterostructure, a single quantum well structure or particularly preferably a multiple quantum well structure. The designation quantum well structure does not comprise any indication about the dimensionality. It therefore encompasses, inter alia, quantum wells, quantum wires and quantum dots and any combination of these structures.

Light-emitting diode chips suitable for emitting infrared radiation during operation are based on arsenide compound semiconductor materials, for example.

In the present context "based on arsenide compound semiconductor materials" means that the active epitaxial layer sequence or at least one layer thereof comprises an arsenide-III compound semiconductor material, preferably $Al_nGa_mIn_{1-n-m}As$ where $0 \leqq n \leqq 1$, $0 \leqq m \leqq 1$ and $n+m \leqq 1$. In this case, said material need not necessarily have a mathematically exact composition according to the above formula. Rather, it can have one or a plurality of dopants and also additional constituents which do not substantially change the characteristic physical properties of the $Al_nGa_mIn_{1-n-m}As$ material. For the sake of simplicity, however, the above formula only comprises the essential constituents of the crystal lattice (Al, Ga, In, As), even though these can be replaced in part by small quantities of further substances.

In a preferred embodiment of the lighting device, the peak wavelength of the infrared radiation source lies in the near infrared range and is 850 nm, for example. Infrared radiation from the near infrared range, for example having a peak wavelength of 850 nm, can advantageously be detected well by means of commercially available camera systems.

The visible radiation source, too, is preferably a semiconductor-based light-emitting diode chip having an epitaxial layer sequence suitable for generating electromagnetic radiation. The semiconductor chip of the visible radiation source is preferably based on phosphide or nitride compound semiconductor materials, since such epitaxial layer sequences are able to generate blue or green visible light.

In the present context "based on phosphide compound semiconductor material" means that the active epitaxial layer sequence or at least one layer thereof comprises a phosphide-III compound semiconductor material, preferably $Al_nGa_mIn_{1-n-m}P$, where $0 \leqq n \leqq 1$, $0 \leqq m \leqq 1$ and $n+m \leqq 1$. In this case, said material need not necessarily have a mathematically exact composition according to the above formula. Rather, it can have one or a plurality of dopants and also additional constituents which do not substantially change the characteristic physical properties of the $Al_nGa_mIn_{1-n-m}P$ material. For the sake of simplicity, however, the above formula only comprises the essential constituents of the crystal lattice (Al, Ga, In, P), even though these can be replaced in part by small quantities of further substances.

In the present context "based on nitride compound semiconductor material" means that the active epitaxial layer sequence or at least one layer thereof comprises a nitride-III compound semiconductor material, preferably $Al_nGa_mIn_{1-n-m}N$, where $0 \leqq n \leqq 1$, $0 \leqq m \leqq 1$ and $n+m \leqq 1$. In this case, said material need not necessarily have a mathematically exact composition according to the above formula. Rather, it can have one or a plurality of dopants and also additional constituents which do not substantially change the characteristic physical properties of the $Al_nGa_mIn_{1-n-m}N$ material. For the sake of simplicity, however, the above formula only comprises the essential constituents of the crystal lattice (Al, Ga, In, N), even though these can be replaced in part by small quantities of further substances.

Light-emitting diode chips which emit visible light having a color locus in the white region of the CIE standard chromaticity diagram preferably comprise luminescence conversion materials, which for example are applied directly on the light-emitting diode chip or are situated in an encapsulation which is disposed downstream of the light-emitting diode chip in the emission direction. The luminescence conversion materials convert part of the electromagnetic radiation generated by the light-emitting diode chip during operation into radiation of other, generally longer, wavelengths, such that the light-emitting diode chip comprising the luminescence conversion materials emits mixed radiation composed of converted and non-converted radiation. If, by way of example, use is made of a light-emitting diode chip which emits blue light during operation and a luminescence conversion material which converts a sufficient part of the blue light into yellow light, the light-emitting diode chip comprising the luminescence conversion materials emits mixed light having blue and yellow spectral components which leaves the observer with a white color impression.

Light-emitting diode chips comprising luminescence conversion materials are described for example in the documents WO 98/12757 and WO 97/50132, the disclosure content of which in this regard is hereby incorporated by reference.

Furthermore, the visible light-emitting diode chip or the infrared light-emitting diode chip or both is or are preferably a thin-film light-emitting diode chip.

A thin-film light-emitting diode chip is distinguished in particular by the following characteristic features:

a reflective layer is applied or formed at a first main area—facing a carrier element—of a radiation-generating epitaxial layer sequence, said reflective layer reflecting at least part of the electromagnetic radiation generated in the epitaxial layer sequence back into the latter; and the epitaxial layer sequence has a thickness in the range of 20 μm or less, in particular in the region of 10 μm.

Preferably, the epitaxial layer sequence contains at least one semiconductor layer having at least one area which has an intermixing structure which ideally leads to an approximately ergodic distribution of the light in the epitaxial layer sequence, that is to say that it has an as far as possible ergodically stochastic scattering behavior.

A basic principle of a thin-film light-emitting diode chip is described for example in the document I. Schnitzer et al., Appl. Phys. Lett. 63 (16), Oct. 18, 1993, 2174-2176, the disclosure content of which in this respect is hereby incorporated by reference.

A thin-film light-emitting diode chip is to a good approximation a Lambertian surface emitter and is therefore suitable in particular for the application in a motor vehicle headlight.

As an alternative, the visible radiation source can also be an incandescent lamp.

In a preferred embodiment of the lighting device, precisely one primary optical unit for beam shaping is disposed downstream of each radiation source in the emission direction of the lighting device. Preferably, the primary optical unit is suitable for reducing the divergence of the radiation emitted by the radiation source. This means, for example, that the light emitted by the radiation source is influenced upon passing through the primary optical unit in such a way that its divergence after exiting from the primary optical unit is less than before entering into the primary optical unit.

The primary optical unit may be for example an optical concentrator, preferably a non-imaging optical concentrator. The optical concentrator has a radiation entrance opening provided for coupling in radiation, and a radiation exit opening provided for coupling out radiation. Usually, if the optical concentrator is used in accordance with its designation as a "concentrator" for radiation, the radiation is coupled into the radiation entrance opening and coupled out from the radiation exit opening. The procedure is precisely reversed in the present case, however, that is to say that when an optical concentrator is used as primary optical unit, it is positioned in such a way that radiation from the radiation source couples into the radiation exit opening, passes through the concentrator and is coupled out with reduced divergence from the radiation entrance opening.

The primary optical unit may be formed, at least partly, in the manner of one of the following optical elements: compound parabolic concentrator (CPC), compound elliptic concentrator (CEC), compound hyperbolic concentrator (CHC). Such a primary optical unit affords the advantage, in particular, that it not only reduces the divergence of the radiation, but furthermore also intermixes particularly well the radiation that passes through it, such that a substantially homogeneous radiance is obtained after exit from the primary optical unit.

Furthermore, the lateral areas of the primary optical unit may contain free-form areas for example having higher-order curvatures.

Furthermore, the primary optical unit may also be a reflector, which is embodied for example as a half-shell. If the lighting device comprises a reflector, the visible radiation source can be arranged for example in defocused fashion in the reflector.

The primary optical unit may also be formed, at least partly, in truncated pyramid-shaped and/or truncated cone-shaped fashion. In this case, the primary optical unit may be a solid body composed of a dielectric material. The electromagnetic radiation passing through the radiation entrance opening into the light-emitting diode optical unit is then preferably reflected at the lateral interfaces of the solid body to the surrounding medium. Suitable dielectric materials for the solid body are for example glass, polymethyl methacrylate (PMMA), polycarbonate (PC) or polyacrylic ester imide (PMMI).

The primary optical unit may have reflective side walls suitable for reflecting at least part of the electromagnetic radiation emitted by the radiation source. The side walls are then at least partly formed in the manner of a CPC, CEC or CHC.

Furthermore, it is also possible that, rather than precisely one primary optical unit being disposed downstream of each radiation source individually, a common primary optical unit is disposed downstream of a plurality of radiation sources in the emission direction of the lighting device for the purpose of beam shaping.

The lighting device may furthermore comprise a plurality of infrared radiation sources. The latter may be present as separate components or within one or a plurality of common modules, for example one or a plurality of component housings. The visible radiation source may likewise be present separately or be integrated with one or a plurality of infrared radiation sources in a common component housing.

A suitable component housing is described in WO 02/084749, for example, the disclosure content of which in this regard is hereby incorporated by reference.

Furthermore, the first and the second radiation source may also be arranged on a common carrier, for example a printed circuit board.

A plurality of infrared radiation sources may be arranged as an array or matrix. The visible radiation source may be integrated or attached to the array or the matrix. If the infrared radiation sources form an array, it is conceivable, for example, for the visible radiation source to be integrated in the center of the array or alternatively to be attached thereto. Furthermore, it is e.g. also possible for two visible radiation sources to be integrated in the center of the array or else to be positioned respectively at the ends of the array. In an equivalent manner, one or a plurality of visible radiation sources may be arranged in the center of a matrix or else replace one or a plurality of whole rows or columns of the matrix.

In a further advantageous embodiment, the lighting device comprises, in addition to at least one primary optical unit, an optical waveguide arranged, at least partly, circumferentially around the light exit surface of the primary optical unit. At least one visible radiation source couples into said optical waveguide, such that the optical waveguide emits visible light and masks the red impression resulting from the infrared radiation source. As already described above, it is possible in this embodiment, too, that either a primary optical unit is disposed downstream of each infrared radiation source or a primary optical unit is disposed downstream of a plurality of infrared radiation sources jointly in the emission direction of the lighting device.

In a preferred embodiment of the lighting device, at least one further optical element is disposed downstream of the first and the second radiation source or, if appropriate, the primary optical unit(s) in the emission direction. In this case, the further optical element shapes the final emission characteristic of the lighting device.

Preferably, the further optical element for shaping the emission characteristic of the lighting device comprises a fiber-optic unit and/or a projection lens.

In a further embodiment, the visible radiation source couples laterally into the primary optical unit. If the primary optical unit is a solid body, a lateral flange, for example, is provided at said solid body for this purpose. If the primary optical unit is a reflector, the infrared radiation source is positioned for example in defocused fashion in the reflector and the visible radiation source is positioned outside the reflector, such that it likewise couples in defocused fashion into the reflector. It is furthermore also conceivable for the visible light source to couple laterally into the further optical element, such as the projection lens or the fiber-optic unit.

Furthermore, a lighting device according to the invention may be contained for example in a position light, a headlight or a signal luminaire.

The lighting device according to the invention is preferably comprised by a motor vehicle headlight. In this case, preferably, the emission characteristic of the infrared radiation source has a high-beam-like emission characteristic and that of the visible radiation source has an emission characteristic having a wider illumination field. In the present case, a "high-beam-like emission characteristic" is understood to be an emission characteristic which comes under the stipulations of UNECE regulation 112 for high-beam light.

In a further preferred embodiment of the motor vehicle headlight, the visible radiation source has a position-light-like emission characteristic. In the present case, a "position-light-like emission characteristic" is understood to be an emission characteristic which comes under the stipulations of UNECE regulation 7 for position light.

However, it is also conceivable for the emission characteristic of the visible radiation source to have a high-beam-like emission characteristic and for the emission characteristic of the infrared radiation source to generate some other illumination field. Furthermore, the emission characteristics of the infrared and the visible radiation source may also both be high-beam-like emission characteristics.

The emission characteristic of the infrared radiation source and/or of the visible radiation source may furthermore also be a low-beam-like or cornering-light-like emission characteristic. In the present case, a "low-beam-like emission characteristic" is understood to be an emission characteristic which comes under the stipulations of UNECE regulation 112 for low-beam light, and a "cornering-light-like emission characteristic" is understood to be an emission characteristic which comes under the stipulations of UNECE regulation 112 for cornering light.

The invention is suitable for example as a lighting device for traffic space in conjunction with infrared-sensitive cameras. Systems of this type can be used in night vision systems, sensor technology systems for pedestrian protection or distance sensor technology for motor vehicles. In this case, lighting using an infrared radiation source affords the advantage, in particular, of not dazzling road users even at relatively high radiation power.

The invention is explained in more detail below on the basis of exemplary embodiments in conjunction with FIGS. 2, 3A and 3B and also 4 to 14.

DETAILED DESCRIPTION

In the exemplary embodiments and figures, identical or identically acting constituent parts are in each case provided with the same reference symbols. The elements illustrated should not be regarded as true to scale, rather individual elements may be illustrated with an exaggerated size for the sake of better understanding.

Figure 2:
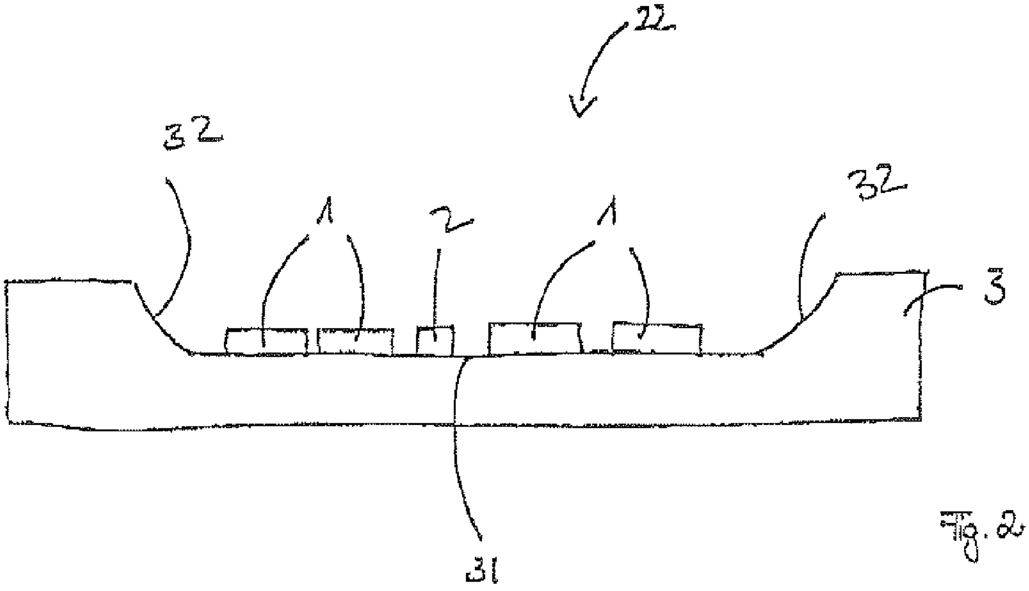
FIG. 2 shows a schematic sectional illustration of a potting trough with LED chips in accordance with one exemplary embodiment of the lighting device.

In the exemplary embodiment in accordance with FIG. 2, four semiconductor-based light-emitting diode chips 1 which emit infrared radiation during operation (referred to for short as "infrared LED chip" hereinafter) as first infrared radiation sources and a light-emitting diode chip 2 that emits white visible light during operation (referred to for short as "white LED chip" hereinafter) as second visible radiation source are fixed on the base 31 of a potting trough 3. The LED chips 1, 2 are arranged in an array, wherein the white chip 2 is situated in the center between in each case two infrared LED chips 1.

Figure 1:
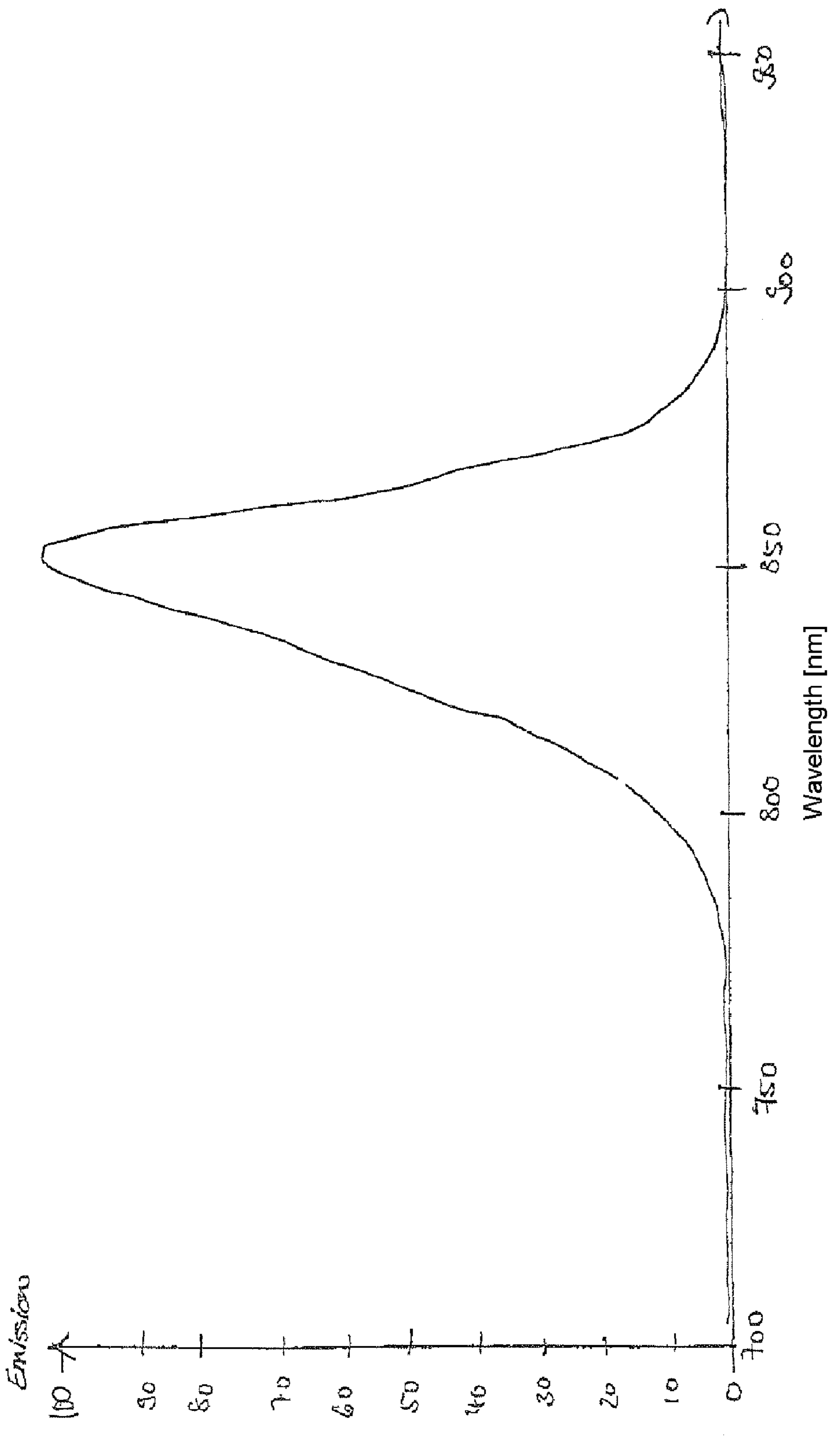
FIG. 1 shows an emission spectrum of a semiconductor-based infrared light-emitting diode.

As already set out in the general part of the description, the infrared LED chips 1 are for example thin-film chips based on GaAs. The emission spectrum of such an infrared LED chip 1 is shown in FIG. 1. The peak wavelength of the emission spectrum is 850 nm in this case. As likewise already set out in the general part of the description, the white LED chip 2 is for example an LED chip which emits blue visible light, which is partly converted into yellow light by luminescence conversion materials, such that white mixed light is generated.

The potting trough 3 has in the present case curved flanks 32 to the sides of the base 31, the form of said flanks serving for beam shaping. Furthermore, the potting trough 3 comprises a reflective ceramic material.

Figure 3A:
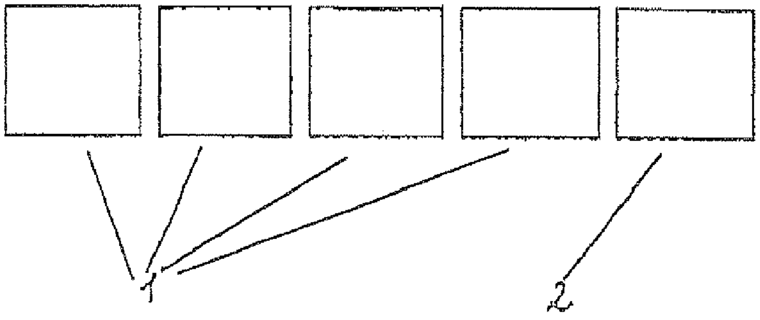
FIGS. 3A and 3B show schematic plan views of chip arrangements in accordance with different exemplary embodiments.

As an alternative, the infrared LED chips 1 and the white LED chip 2 may for example also be arranged, as shown in FIG. 3A, in an array in which the white LED chip 1 is arranged at one of the outermost positions of the array.

Figure 3B:
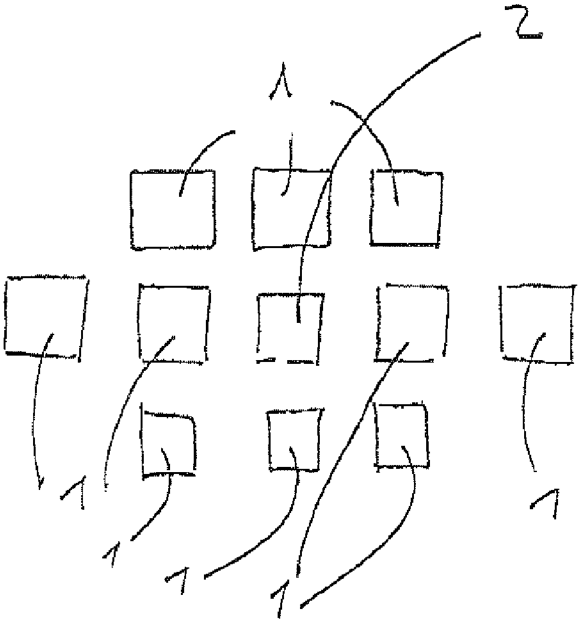

One possible matrix arrangement of the infrared LED chips 1 and the white LED chip 2 is shown in FIG. 3B. Here the white LED chip 2 is arranged in the center of the matrix and all further positions of the matrix are occupied by infrared LED chips 1. It is also conceivable that, in the case of such a matrix arrangement, the white LED chip 2 is situated at a different position, or that the matrix comprises a plurality of white LED chips 2, preferably arranged symmetrically (not illustrated).

Figure 4:
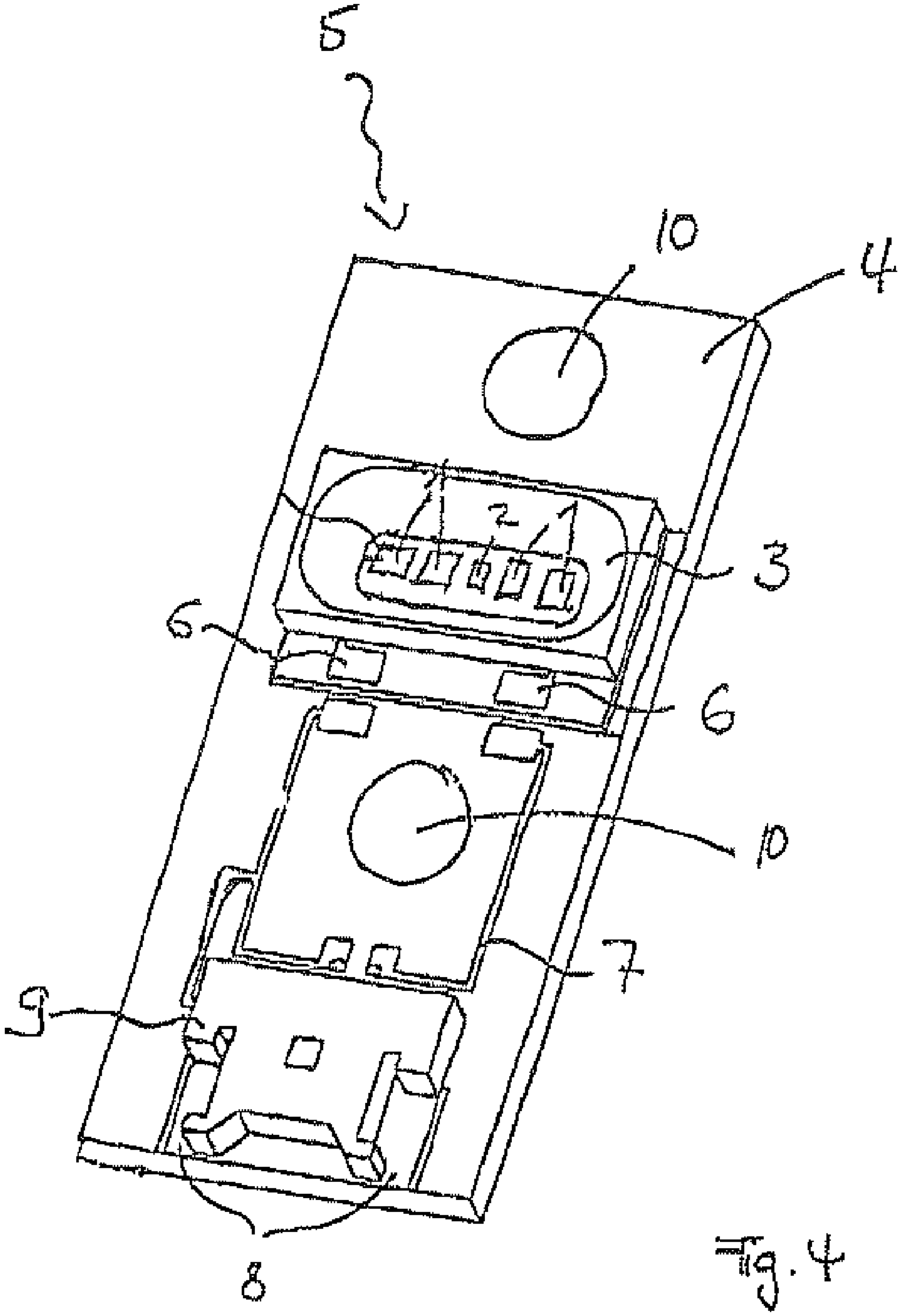
FIGS. 4, 5 and 6 show schematic perspective views of the lighting device and details of the lighting device in accordance with a first exemplary embodiment.
Figure 5:
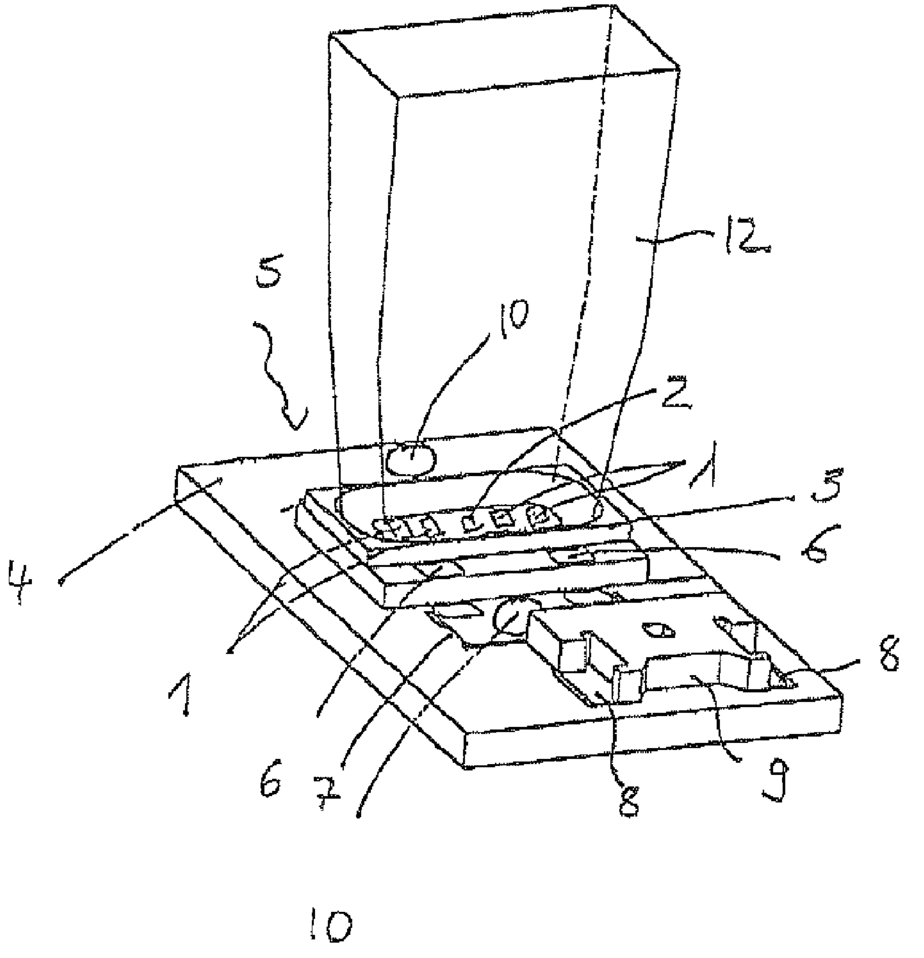

As can be seen in FIG. 4, the potting trough 3 is mounted onto a printed circuit board 4 and thus forms an LED module 5. The potting trough 3 furthermore has contact areas 6 via which electrical contact can be made with the LED chips 1, 2. The contact areas 6 of the potting trough 3 are electrically conductively connected to electrical external contact areas 8 by means of conductor tracks 7 on the printed circuit board 4. Contact can be made externally with the external contact areas 8 via a simple plug connection by means of a mating connector 9. Furthermore, in the present case the printed circuit board 4 has fitting holes 10 provided for receiving fitting pins 11 for fixing the LED module 5. As shown in FIG. 5, a primary optical unit 12, in the present case a CPC-like optical unit, can be placed onto the potting trough 3 in a manner disposed downstream of the LED chips 1, 2 in their emission direction.

Figure 6:
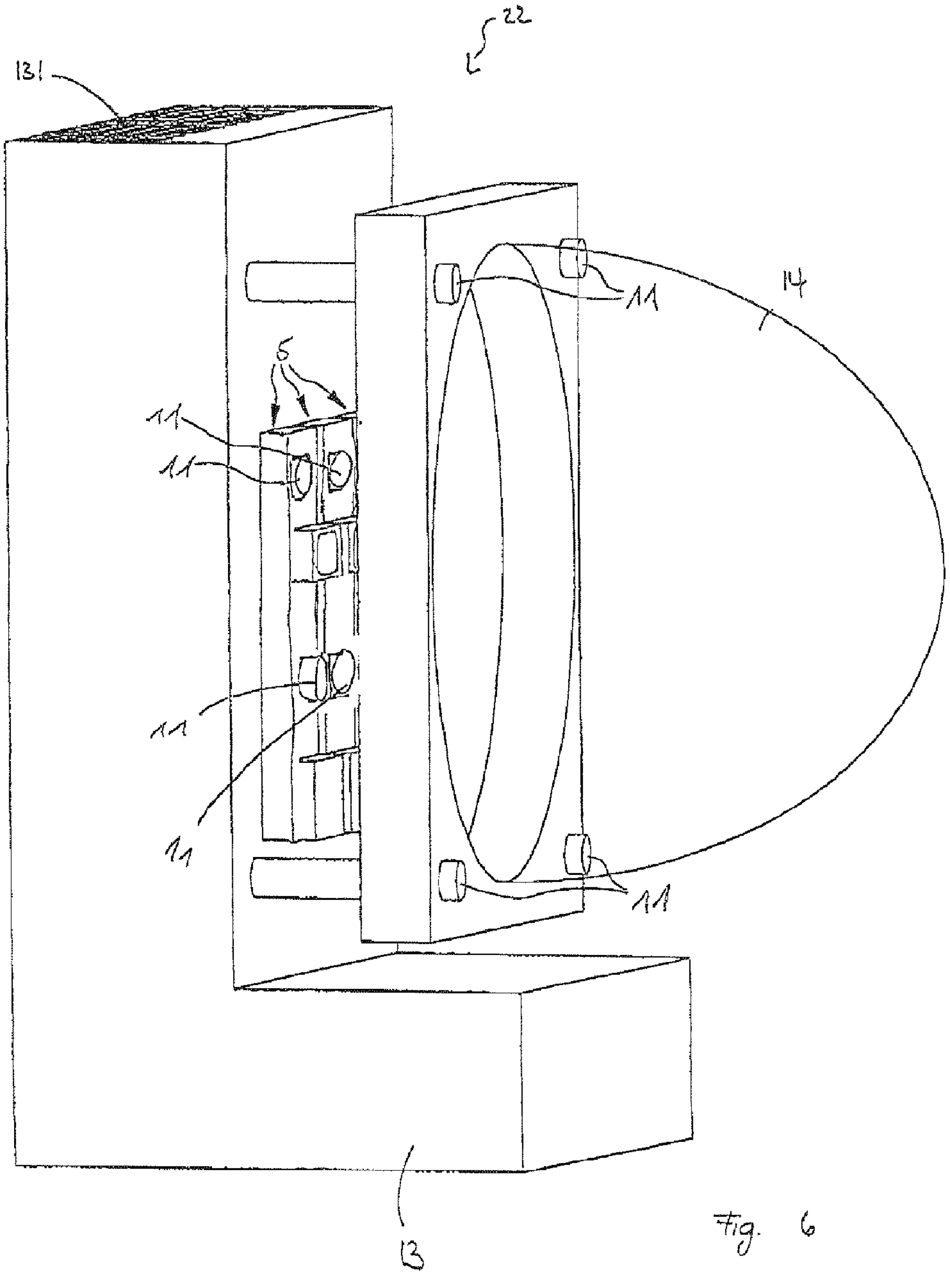

A plurality of the LED modules 5 described above are arranged, with or without a CPC-like optical unit 12, on a further carrier 13 and fixed to the latter by means of fitting pins 12. In the present case, the LED modules 5 are mounted without a primary optical unit 12 onto the carrier 13 (cf. FIG. 6). However, it is also conceivable for a primary optical unit 12, for example a CPC-like optical unit, in each case to be placed onto the potting troughs 3 of the LED modules 5, as shown in FIG. 5. Furthermore, it is also possible for a common primary optical unit 12 to be assigned to a plurality of LED modules 5 (not illustrated).

The further carrier 13 preferably also serves as a heat sink for the heat generated by the LED modules 5 during operation. For this purpose, the carrier 13 in the present case has cooling fins 131 at its surface remote from the LED modules 5. Preferably, the carrier 13 comprises, for better thermal conduction, a metal having good thermal conductivity, such as copper for example. A further optical element, in the present case a projection lens 14, which is likewise fixed to the carrier 13 by means of fitting pins 11, is arranged downstream in the emission direction of the LED modules 5. The fixing of the LED modules 5 and of the projection lens 14 to the carrier 13 with the aid of fitting pins 11 makes it possible to adjust the LED modules 5 among one another and also with respect to the projection lens 14.

Figure 7:
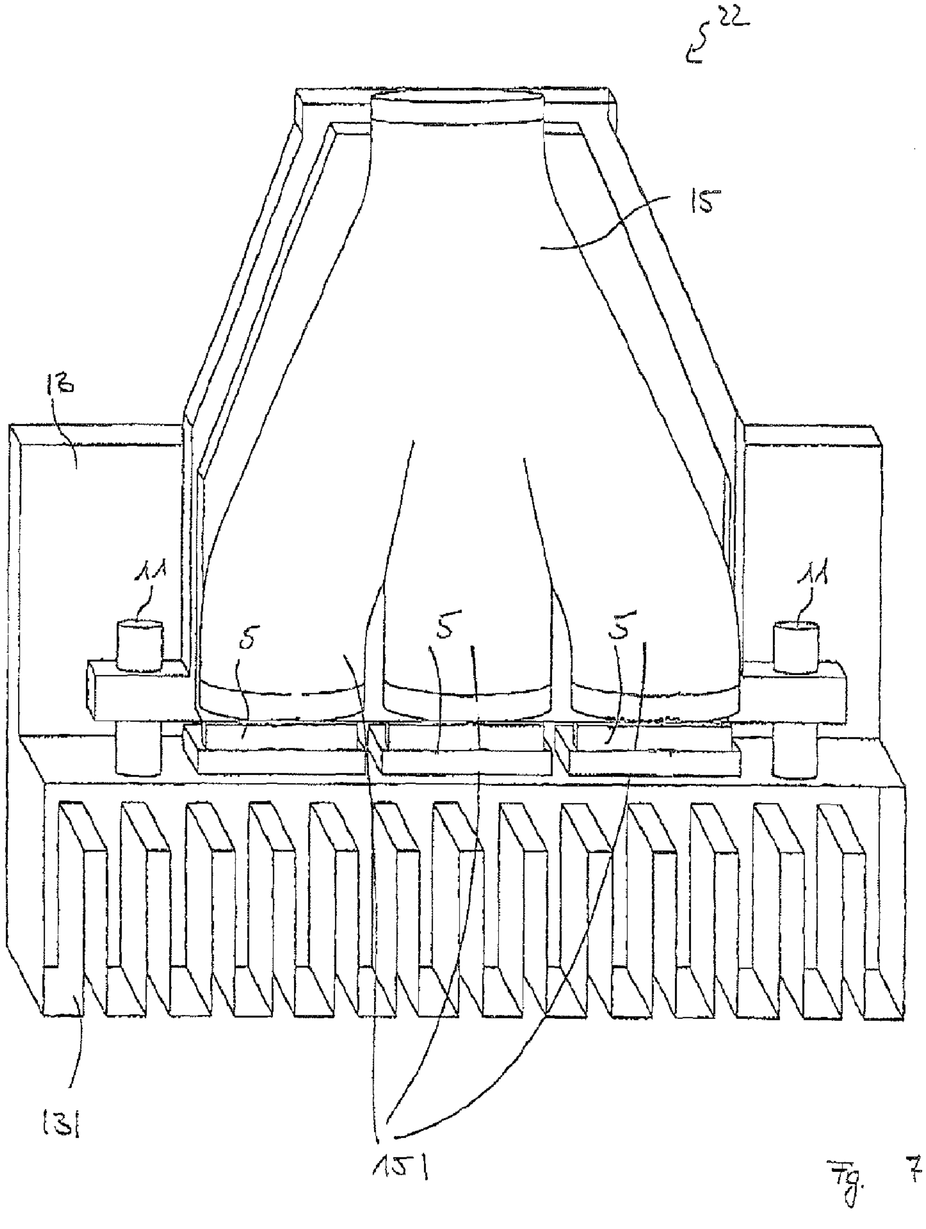
FIG. 7 shows a schematic perspective view of the lighting device in accordance with a second exemplary embodiment.

As an alternative to a projection lens 14, a fiber-optic unit 15 as further optical element may also be disposed downstream of the LED modules 5 in the emission direction (see FIG. 7). In this case, the radiation generated by the LED chips 1, 2 during operation couples into the fibers 151 of the fiber-optic unit 15. Preferably, each LED chip 1, 2 couples radiation into precisely one fiber 151 of the fiber-optic unit 15 that is uniquely assigned to the LED chip 1, 2. The fiber-optic unit 15 is likewise fixed to the carrier 13 by means of fitting pins 11, said carrier likewise having cooling fins 131 as already described above.

Figure 8:
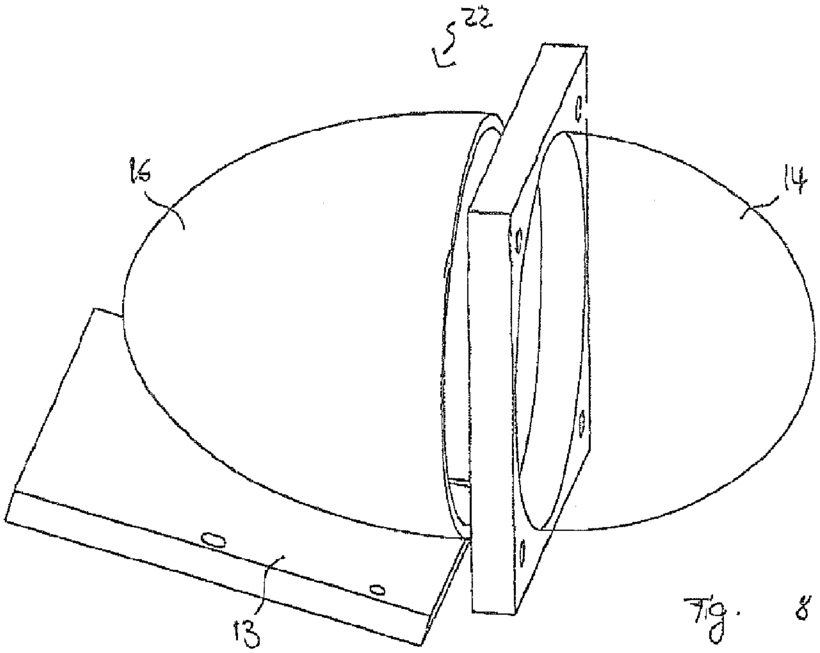
FIGS. 8 and 9 show schematic perspective views of a lighting device in accordance with a third exemplary embodiment.
Figure 9:
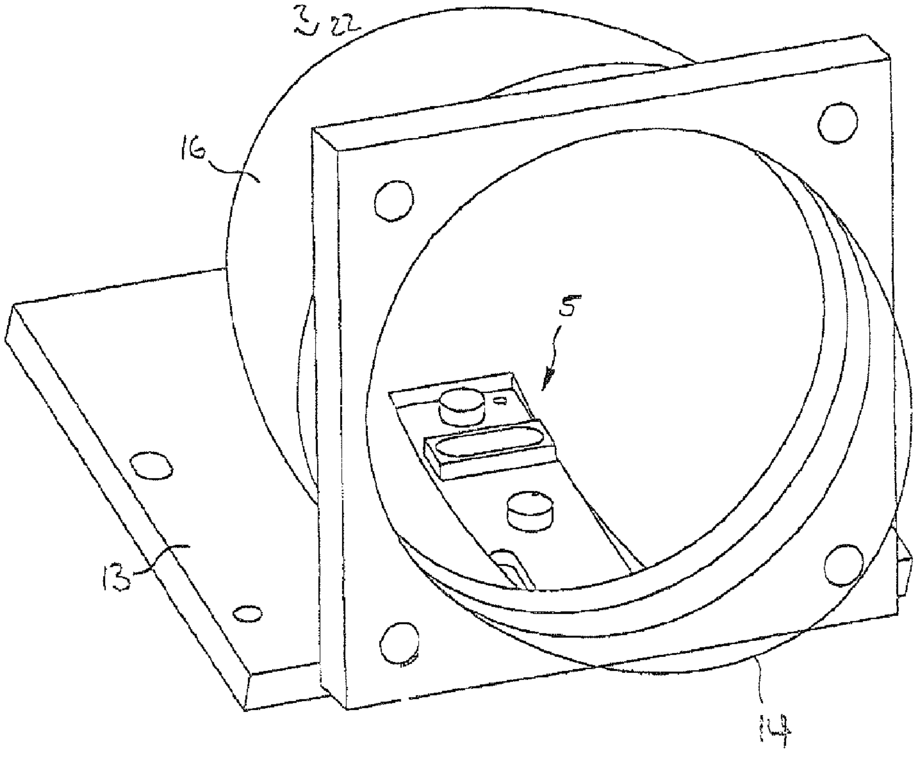

In contrast to the exemplary embodiments described above, the lighting device 22 in the exemplary embodiment in accordance with FIGS. 8 and 9 comprises a reflector 16 as primary optical element, said reflector being embodied as a half-shell in the present case. The reflector 16 is likewise mounted onto a carrier 13, the carrier having no separate cooling fins 131. An LED module 5 is fitted in defocused fashion in the interior of the reflector 16 (see FIG. 9). Furthermore, a projection lens 14 as further optical element is disposed downstream of the reflector 16 in the emission direction.

Figure 10:
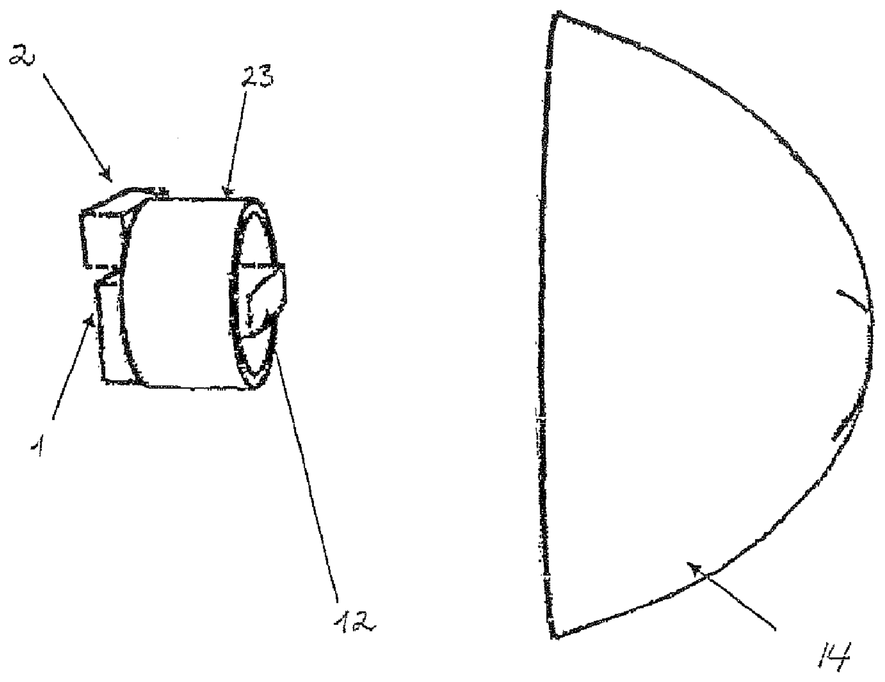
FIG. 10 shows schematic perspective views of a lighting device in accordance with a fourth exemplary embodiment.

The lighting device in accordance with FIG. 10 comprises an infrared radiation source 2 and a visible radiation source 1, the infrared radiation source 2 coupling into the primary optical unit 12 and the visible radiation source 1 coupling into an optical waveguide 23 arranged circumferentially around the primary optical unit 12. A projection lens 14 is once again disposed downstream of the primary optical unit 12 and the circumferential optical waveguide 23 in the emission direction.

Figure 11:
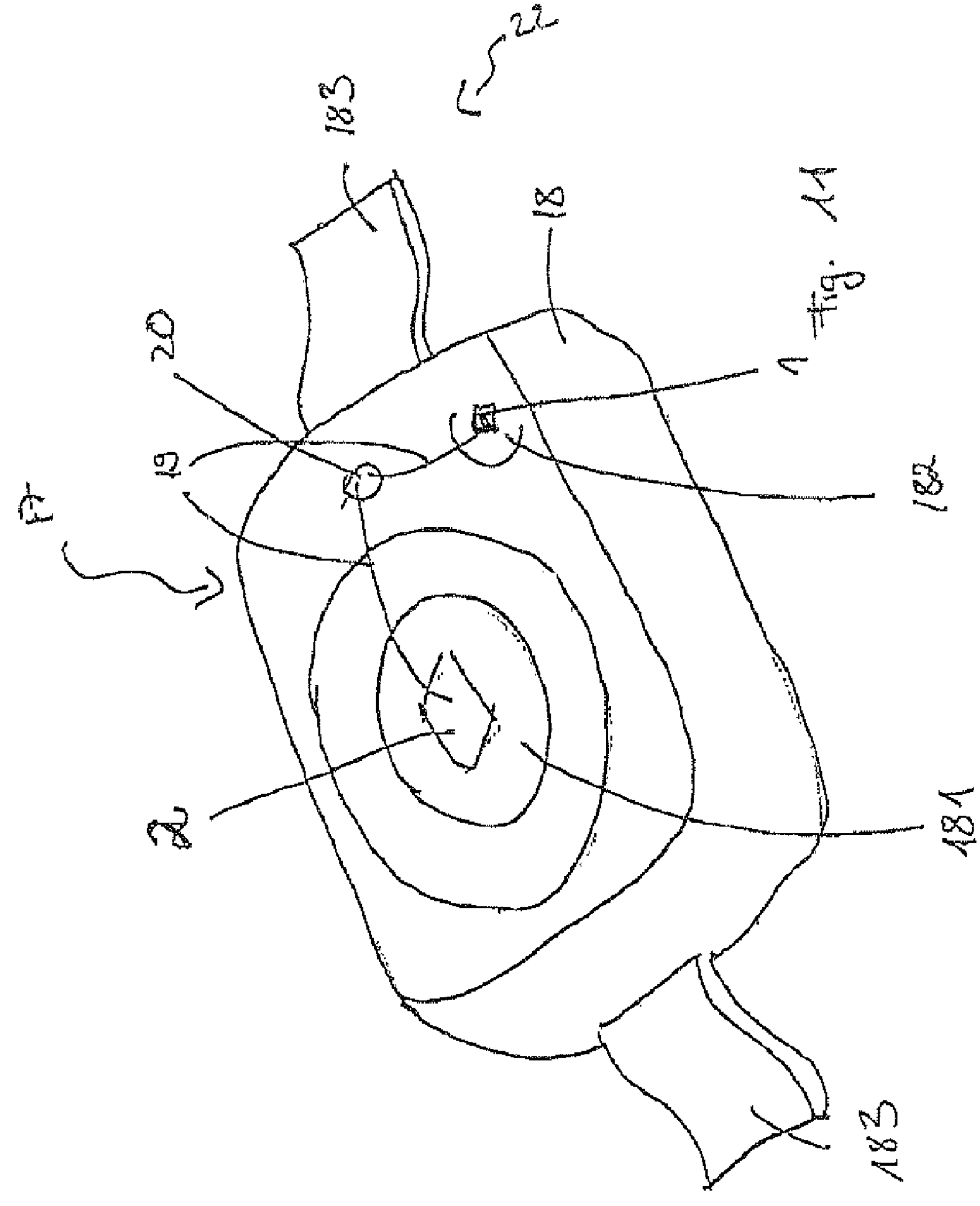
FIG. 11 shows schematic perspective views of a component housing with an infrared and a white LED chip in accordance with one exemplary embodiment.

As an alternative to an LED module 5, it is also possible to use a light-emitting diode component (LED component) 17 in the exemplary embodiments described above, said component comprising a component housing 18 with at least one white LED chip 2 and an infrared LED chip 2. A suitable LED component 17 is illustrated in FIG. 11. This involves a component housing 18 having a centrally arranged depression 181, into which the white LED chip 2 is mounted, and a lateral smaller depression 182, into which the infrared LED chip 1 is mounted. The two LED chips 1, 2 are in each case electrically contact-connected by means of a bonding wire 19 to a bonding pad 20, which produces an electrically conductive connection to the connection parts 183 projecting laterally from the component housing. This component 17 can also be mounted onto a printed circuit board 4.

Figure 12:
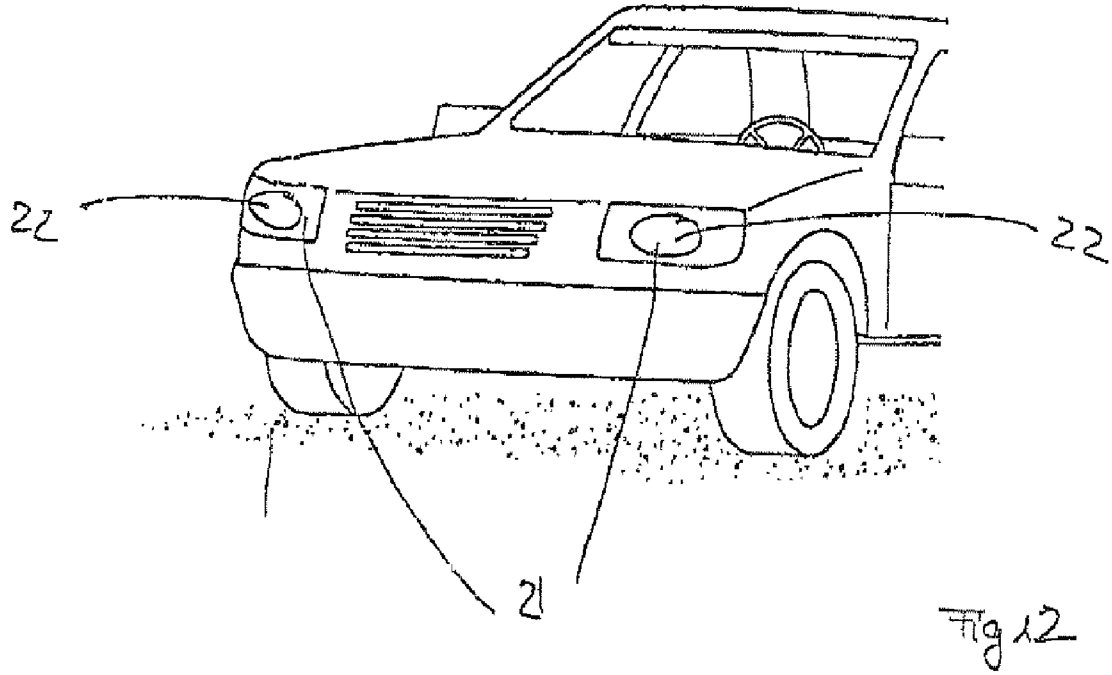
FIG. 12 shows a schematic illustration of a motor vehicle headlight in accordance with one exemplary embodiment.

As shown in FIG. 12, the lighting devices 22 described above may be comprised by a motor vehicle headlight 21. The emission characteristic of such a motor vehicle headlight comprises a component of infrared radiation (referred to as “infrared emission characteristic” hereinafter) and also a component of white radiation (referred to as “white emission characteristic” hereinafter).

These components of the emission characteristic are set in a targeted manner with the aid of the beam-shaping element of the lighting device 22, such as, for example, the primary optical unit(s) 12, the further optical element(s) 14, 15 and also, if appropriate, the flanks 32 of the potting trough(s) 3.

Figure 13:
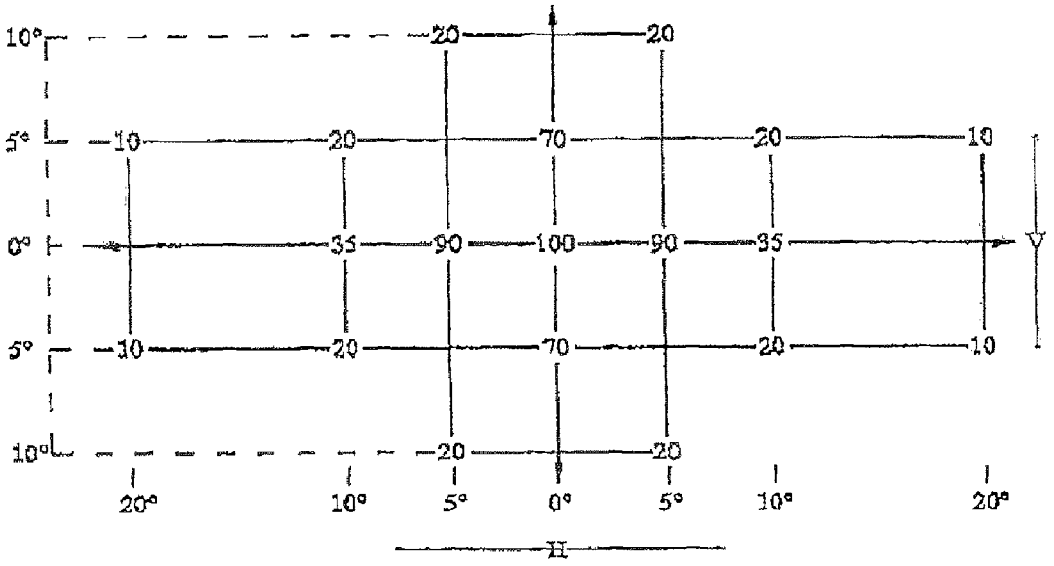
FIGS. 13 and 14 show schematic illustrations of the emission characteristic of a lighting device in accordance with one exemplary embodiment.
Figure 14:
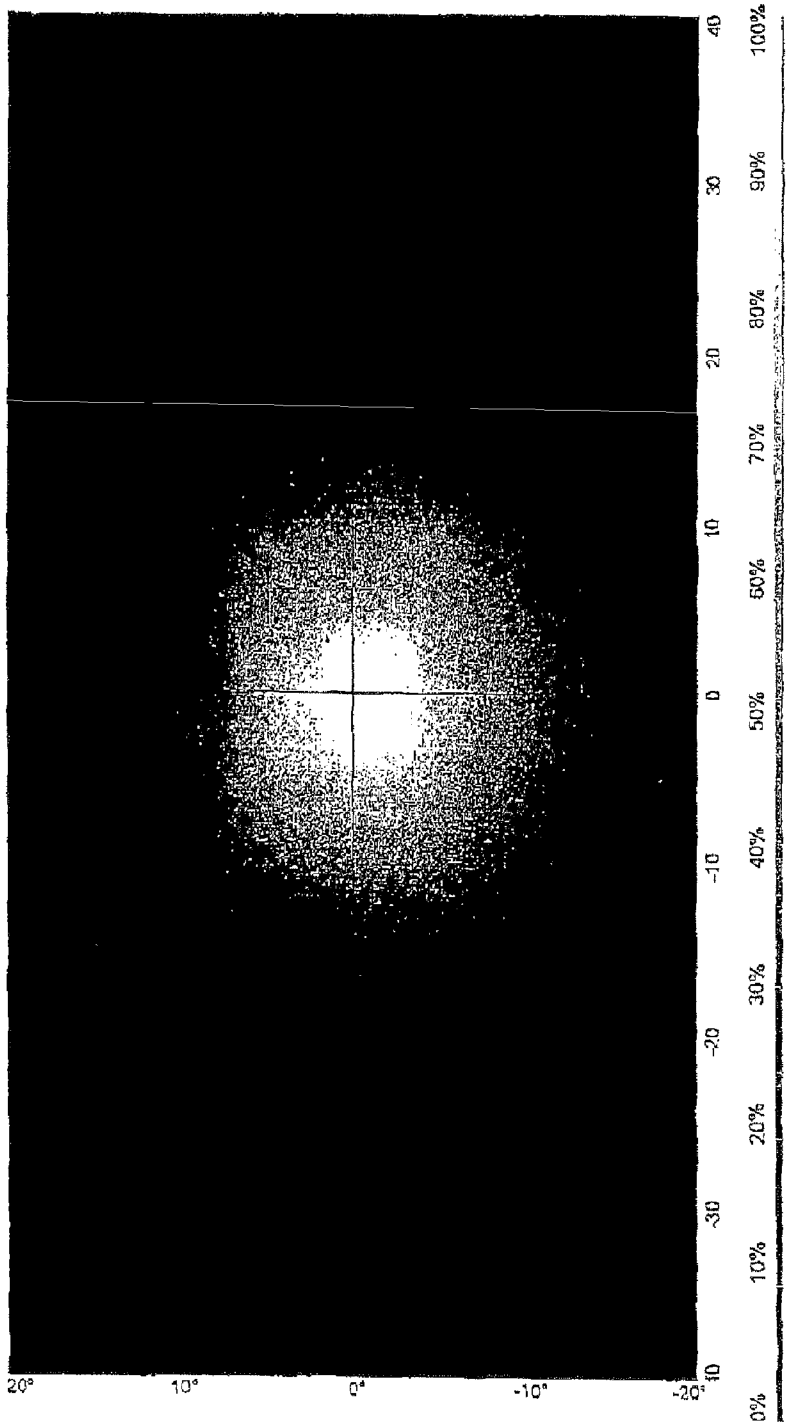

The visible emission characteristic is for example a position-light-like emission characteristic, as is shown schematically in FIG. 13 on the basis of percentage intensity values as a function of the horizontal emission angle (x-axis) and the vertical emission angle (y-axis).

The infrared emission characteristic is for example a high-beam-like emission characteristic, as shown schematically by the simulated percentage intensity values of a matrix-type arrangement of ten infrared LED chips 2 with two rows and five columns as a function of the horizontal emission angle (x-axis) and the vertical emission angle (y-axis).

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A lighting device, in particular provided for the front region of a motor vehicle, which lighting device emits electromagnetic radiation during operation, comprising:

a plurality of first radiation sources, which emit infrared radiation, said first radiation sources comprising light emitting diode chips, and at least one second radiation source which emits visible light with a color locus in the white region of the CIE chromaticity diagram, said second light source comprising a light emitting diode chip, wherein the first radiation source and the second radiation source are arranged in such a way that the second radiation source outshines the first radiation source, said light emitting diode chips of the first radiation source and of the at least one second radiation source are arranged as an array or a matrix, and said light emitting diode chips of the first radiation source and of the at least one second radiation source are fixed on the base of a common potting trough, which comprises a reflective ceramic material.

2. The lighting device as claimed in claim 1, which generates a white color impression for a human observer.

3. The lighting device as claimed in claim 1, in which the light-emitting diode chip is a thin-film light-emitting diode chip.

4. The lighting device as claimed in claim 1, in which precisely one primary optical unit is disposed downstream of each radiation source in the emission direction of the lighting device.

5. The lighting device as claimed in claim 4, in which the primary optical unit is formed to reduce the divergence of the radiation emitted by the radiation source.

6. The lighting device as claimed in claim 4, in which the primary optical unit is formed at least partly according to one of the following optical elements: compound parabolic concentrator, compound elliptic concentrator, compound hyperbolic concentrator.

7. The lighting device as claimed in claim 4, in which the primary optical unit is a reflector.

8. The lighting device as claimed in claim 4, wherein the primary optical unit is formed in at least partly truncated pyramid-shaped and/or truncated cone-shaped fashion.

9. The lighting device as claimed in claim 1, in which a common primary optical unit is disposed downstream of a plurality of radiation sources in the emission direction of the lighting device.

10. The lighting device as claimed in claim 1, in which the first and the second radiation source are arranged on a common carrier.

11. The lighting device as claimed in claim 10, in which the carrier is a printed circuit board.

12. The lighting device as claimed in claim 1, in which the first and the second radiation source are arranged on a common component housing.

13. The lighting device as claimed in claim 1, in which at least one further optical element is disposed downstream of the first and the second primary radiation source or, if appropriate, a primary optical unit(s) in the emission direction.

14. The lighting device as claimed in claim 13, in which a further optical element comprises a fiber-optic unit and/or a projection lens.

15. The lighting device as claimed in claim 1, comprising at least one primary optical unit which is disposed downstream of the first radiation source in the emission direction, wherein at least one optical waveguide into which at least one second radiation source couples is arranged, at least partly, circumferentially around the light exit surface of the primary optical unit.

16. The lighting device as claimed in claim 1, in which the peak wavelength of the first radiation source is 850 nm.

17. A motor vehicle headlight comprising at least one lighting device as claimed in claim 1.

18. The motor vehicle headlight as claimed in claim 17, in which the radiation from the first primary radiation source has a high-beam-like emission characteristic.

19. The motor vehicle headlight as claimed in claim 18, in which the radiation from the second primary radiation source has a position-light-like emission characteristic.

* * * * *

UNITED STATES PATENT AND TRADEMARK OFFICE

CERTIFICATE OF CORRECTION

PATENT NO. : 7,862,216 B2
APPLICATION NO. : 11/815036
DATED : January 4, 2011
INVENTOR(S) : Rainer Friedrichs et al.

It is certified that error appears in the above-identified patent and that said Letters Patent is hereby corrected as shown below:

On the Title Page, item [73]:
ASSIGNEE, line 3, delete “bechrankter” and insert --beschrankter--.

Signed and Sealed this
First Day of March, 2011

David J. Kappos
*Director of the United States Patent and Trademark Office*